United States Patent Office 3,625,073
Patented Dec. 7, 1971

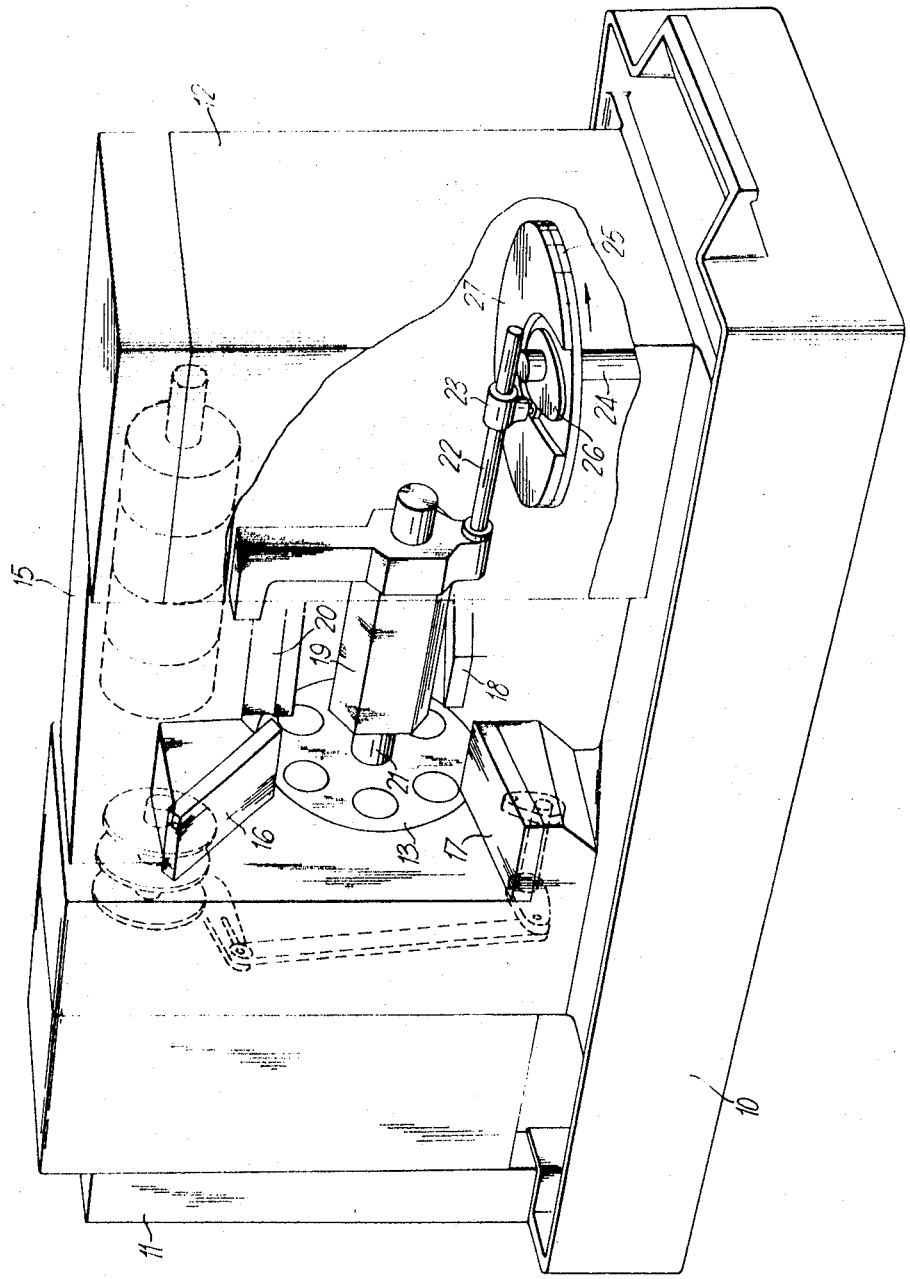

3,625,073
AUTOMATIC LATHES
Reginald John Dixon, Solihull, and Harold James Gilbert, Coventry, England, assignors to Wickman Machine Tool Sales Limited, Coventry, England
Filed Nov. 14, 1969, Ser. No. 876,962
Int. Cl. F16h 25/08
U.S. Cl. 74—55                                                             3 Claims

ABSTRACT OF THE DISCLOSURE

A lathe having a plurality of tool slides, at least one of which is controlled by a cam comprising a disc member on which are fixed parts defining cam surfaces extending parallel to the axis of adjoining shafts, the slide being connected to a cam follower by means of a rigid connection.

---

This invention relates to single or multi-spindle automatic lathes of the kind having a plurality of tool slides, one of which is in the form of a tool block which is movable longitudinally with respect to the machine spindle axis or axes, the tool block being automatically controlled by cam means in accordance with a predetermined operating cycle of the machine, to be advanced at relatively fast speed and then slowed during the feed stroke and finally, after a dwell, the tool block is retracted at relatively fast speed.

Machines of this kind have, in the past, utilized drum cams for imparting movement of the tool block. Such cams are difficult and costly to manufacture and difficult and time consuming for an operator to change, should this be required.

The object of the invention is to provide a lathe of the kind specified in a convenient form.

According to the present invention, a lathe of the kind specified is characterized in that the cam means for controlling movements of the longitudinally movable tool block comprises a disc member mounted upon a driving shaft, said disc member having cam surfaces extending parallel to the axis of the driving shaft, said cam surfaces being disposed at varying distances from the axis of the driving shaft, a cam follower rigidly fixed to the tool block and arranged to engage with the cam surfaces, so that, as the disc member rotates, when the machine is in operation, the cam follower and tool block will be advanced and returned in accordance with the predetermined cycle.

The invention will now be described by way of example with reference to the accompanying drawing, the single figure of which is a diagrammatic perspective view of a machine incorporating the present invention.

The machine illustrated is a multi-spindle automatic lathe having a base 10, at opposite ends of which are respective upstanding superstructures 11, 12. The superstructure 11 carries a spindle drum indicated at 13 having multiple work spindles mounted on respective parallel axes. Each work spindle carries a chuck and is rotatable relatively to the spindle drum 13. The spindle drum 13 is indexible between successive positions so that successive operations can be carried out on work pieces held in the respective chucks.

The superstructure 12, as well as a bridge structure 15, extending between the tops of the superstructure 11, 12, contain mechanisms for operating tool slides on the machine.

The machine, as illustrated, has four transversely movable tool slides, three of which are illustrated at 16, 17 and 18. There is also a tool block 19 which is movable lengthwise of the machine in a direction which is parallel to the spindle axes. A further longitudinally movable slide 20 is also illustrated.

The block 19 is mounted upon a fixed horizontal shaft 21, mounted at one end in the superstructure 11 through the centre of the spindle drum 13, and in the superstructure 12 at the other end.

The tool slides 16, 17, 18 and 20 and tool block 19 are moved towards and away from workpieces in the chucks in accordance with a predetermined cycle which is automatically controlled.

The mechanism which controls the movement of the block 19 will now be described. The block 19 has fixed to it, at its end remote from the spindle drum 13, a horizontal bar 22, the axis of which is parallel to the shaft 21. The bar 22 is axially slidable in bearings (not shown) in the superstructure 12. Within this superstructure a cam follower 23 is connected to the bar 22. The cam follower 23 can be adjusted lengthwise of the bar 22, but is normally fixed without provision for such adjustment.

The cam follower 23 comprises a sleeve clamped to the bar 22 and a roller mounted upon a downwardly extending vertical spindle.

The cam follower 23 engages with a cam mounted upon a vertical shaft 24. A driving mechanism (not illustrated) is connected to the shaft 24 whereby it is rotated when the machine is in operation in timed relationship with the machine cycle. The shaft 24 is suitably supported in bearings at its upper and lower ends.

The cam is formed of three parts comprising a disc member 25 mounted on the shaft 24 and a pair of cam parts 26 and 27. These parts 26, 27 are mounted in fixed relation upon the disc member 25 and provide vertical cam surfaces against which the roller of the cam follower 23 engages. The disc member 25 with the parts 26, 27 is rotated in use in an anti-clockwise direction and the block 19 is caused to execute reciprocatory motion which comprises an initial fast advance in the direction towards the chucks. The movement slows during a feed stroke in the same direction in which tools carried on the block 19 engage with workpieces in the chucks respectively, and at the end of the feed stroke there is a dwell period in which, during a predetermined angular movement of the disc member 25, substantially no longitudinal movement of the block 19 takes place. At the end of the dwell period, the block 19 is returned to its initial position at relatively fast speed.

The connection between the block 19 and the cam follower 23 is rigid in operation and provides for direct cam control of the block travel. The configuration described enables the load to be applied to the block 19 in the optimum position. In use, the flat cam can be easily and quickly changed by an operator. Furthermore if a special cam shape is required this can easily be manufactured without special equipment.

In the machine illustrated, other slides are controlled by disc or drum cams of forms differing from the control for the block 19. They are not described since they do not relate to the invention.

The cam 27 may, however, be omitted, the return motion of the slide being controlled by springs or hydraulic means.

Alternatively part of the cam 27 only is provided and a separate return cam is used in association with a second cam follower secured to the bar 22 to ensure the initial return of the slide from its maximum forward position.

The slides of the constructions herein described are intended to carry tools, but may alternatively carry workpieces movable relatively to tools.

Having thus described our invention what we claim as new and desire to secure by Letters Patent is:

1. An automatic lathe of the kind having one or more spindles, and a plurality of tool slides, one of which is in the form of a tool block which is movable longitudinally with respect to the machine spindle axis or axes characterized by cam means for controlling movements of the longitudinally movable tool block, said cam means comprising a disc member mounted upon a driving shaft, said disc member having cam surfaces extending parallel to the axis of the driving shaft, said cam surfaces being disposed at varying distances from the axis of the driving shaft, a cam follower rigidly and directly fixed to the tool block and arranged to engage with the cam surfaces, so that, as the disc member rotates, when the machine is in operation, the cam follower and tool block will be advanced and returned in accordance with a cycle determined by the shapes of the cam surfaces.

2. An automatic lathe as claimed in claim 1 in which the cam surfaces are formed on one or more parts fixed to a member which is fixed to the driving shaft.

3. An automatic lathe as claimed in claim 1 in which the tool block is movable horizontally and the driving shaft as well as the cam surfaces on the disc member are vertically disposed.

References Cited

UNITED STATES PATENTS

| | | | |
|---|---|---|---|
| 1,337,908 | 4/1920 | Hembree et al. | 74—55 |
| 2,196,416 | 4/1940 | Jacob | 74—56 |
| 2,825,121 | 3/1958 | Williams | 82—3 |
| 2,837,935 | 6/1958 | Deliso | 29—38 |
| 3,281,037 | 10/1966 | Young | 74—55 |
| 3,292,466 | 12/1966 | Jacoby | 82—3 |

WILLIAM F. O'DEA, Primary Examiner

W. S. RATLIFF, JR., Assistant Examiner

U.S. Cl. X.R.

82—3